United States Patent
Uchida et al.

(10) Patent No.: US 9,362,985 B2
(45) Date of Patent: Jun. 7, 2016

(54) PORTABLE APPARATUS AND FEED SYSTEM

(71) Applicant: FUJITSU LIMITED, Kawasaki-shi, Kanagawa (JP)

(72) Inventors: Akiyoshi Uchida, Akashi (JP); Masakazu Taguchi, Kobe (JP); Satoshi Shimokawa, Kawasaki (JP); Kiyoto Matsui, Miki (JP); Hiroyasu Kawano, Ebina (JP)

(73) Assignee: FUJITSU LIMITED, Kawasaki (JP)

( * ) Notice: Subject to any disclaimer, the term of this patent is extended or adjusted under 35 U.S.C. 154(b) by 499 days.

(21) Appl. No.: 13/901,028

(22) Filed: May 23, 2013

(65) Prior Publication Data

US 2013/0249312 A1    Sep. 26, 2013

Related U.S. Application Data

(63) Continuation of application No. PCT/JP2010/071253, filed on Nov. 29, 2010.

(51) Int. Cl.
| | |
|---|---|
| *H01F 27/42* | (2006.01) |
| *H04B 5/00* | (2006.01) |
| *H01F 27/36* | (2006.01) |
| *H01F 38/14* | (2006.01) |
| *H02J 7/02* | (2016.01) |
| *G06K 7/10* | (2006.01) |

(52) U.S. Cl.
CPC .......... *H04B 5/0037* (2013.01); *G06K 7/10178* (2013.01); *H01F 27/365* (2013.01); *H01F 38/14* (2013.01); *H02J 7/025* (2013.01)

(58) Field of Classification Search
CPC ... H01F 27/365; H01F 38/14; G06K 7/10178; H04B 5/0037; H02J 7/025

USPC .......................................................... 307/104
See application file for complete search history.

(56) References Cited

U.S. PATENT DOCUMENTS

| | | | |
|---|---|---|---|
| 8,188,826 B2 * | 5/2012 | Okada ..................... | H01F 38/14 336/192 |
| 9,030,159 B2 * | 5/2015 | Chen ..................... | A61N 1/3787 320/108 |

(Continued)

FOREIGN PATENT DOCUMENTS

| | | |
|---|---|---|
| JP | 63-305599 | 12/1988 |
| JP | 08-241386 | 9/1996 |

(Continued)

OTHER PUBLICATIONS

International Search Report, mailed in connection with PCT/JP2010/071253 and mailed Feb. 15, 2011.

*Primary Examiner* — Jared Fureman
*Assistant Examiner* — Duc M Pham
(74) *Attorney, Agent, or Firm* — Fujitsu Patent Center

(57) ABSTRACT

A portable apparatus includes a case, a coil situated inside the case, a circuit disposed inside the case to receive power based on a first frequency via the coil and to perform communication based on a second frequency higher than the first frequency, and a magnetic shield having a first portion and a second portion stacked one over another in a direction perpendicular to the coil between the coil and an inside of the case, the second portion being closer to the coil than the first portion, wherein permeability of the first portion is higher than permeability of the second portion situated toward the coil with respect to the first frequency.

6 Claims, 13 Drawing Sheets

(56) References Cited

U.S. PATENT DOCUMENTS 9,084,343 B2 * 7/2015 Waffenschmidt ..... H01F 27/365
2007/0095913 A1 5/2007 Takahashi et al.

FOREIGN PATENT DOCUMENTS

| JP | 09-135189 | 5/1997 |
| JP | 2004-364199 | 12/2004 |

* cited by examiner

PORTABLE APPARATUS AND FEED SYSTEM

CROSS-REFERENCE TO RELATED APPLICATIONS

This application is a continuation application of International Application PCT/JP2010/071253 filed on Nov. 29, 2010 and designated the U.S., the entire contents of which are incorporated herein by reference.

FIELD

The disclosures herein generally relate to electronic apparatuses, and particularly relate to a portable apparatus and a feed system by which power is magnetically fed.

BACKGROUND

The communications technology used for non-contact-type IC cards such as FeliCa supplies power and exchanges signals by use of a card reader and writer that generates an alternating current magnetic field, whose changes are converted by an antenna coil in the IC card into an induced current. During a short time in which the IC card is held over the card reader and writer, the power required by the IC card to operate is transmitted to the IC card, which then conducts data communication based on the received power. This FeliCa communications technology is already implemented in some portable phones, and is used in transactions such as ones for making a payment. Portable apparatuses such as portable phones are provided with an internal battery, so that no power is fed from a card reader and writer during communication.

In portable apparatuses such as portable phones, a contact-type power feeding method is currently employed in order to charge the internal batteries. It is expected, however, that in near future, a non-contact type power feeding method using magnetism such as electromagnetic induction or magnetic-field resonance will be used in portable apparatuses. It might be possible to transfer power not only over a short distance but also over a relatively long distance by use of magnetic-field resonance. In such a case, placing a portable apparatus on a desk or the like in a casual manner would be sufficient to easily charge the apparatus, which improve usability. The principle of the non-contact power feeding is basically the same as the principle of power transmission used in FeliCa. Changes in the magnetic field generated at the power transmission side are converted into an induced current by a coil at the power receiving end, thereby transmitting power.

In portable phones provided with FeliCa, a magnetic shield is disposed between an antenna coil and the core of the portable phone. The antenna coil is disposed near the exterior surface of the outer case of the portable phone while circuits constituting the portable phone's internals inside the case are comprised of materials inclusive of metal such as a circuit board and a battery. In the absence of the magnetic shield, magnetic flux generated by the transmission side and passing through the antenna coil at the receiving end generates eddy currents in the metallic materials of the internals. Such eddy currents generate a reactive magnetic field, and also result in power loss caused by eddy current loss. This gives rise to problems such as communication failure and a drop in power feeding efficiency.

In consideration of the above, a magnetic shield is placed behind the antenna coil disposed near the surface, i.e., placed between the antenna coil and the internal circuits. This magnetic shield is composed of a material having a large permeability (i.e., the real part of permeability) and a small magnetic loss (i.e., the imaginary part of permeability), so that the magnetic field forms a circulating flow along the magnetic shield to return to the transmission side. Accordingly, the magnetic field does not reach the metallic materials inside the portable phone, so that there is neither a reactive magnetic field nor electric loss generated by eddy currents.

In order to cause the magnetic field to form a circulating flow, the product of the volume and permeability of the magnetic shield may need to be no smaller than a predetermined value. Further, low magnetic loss may be needed to reduce the loss of the magnetic field inside the magnetic shield. In general, the magnetic property of magnetic material is frequency dependent. Because of this, high permeability and low magnetic loss may need to be present at 13.56 MHz that is the frequency used by FeliCa.

When power is transmitted to a portable phone through non-contact power feeding as previously described, the use of frequency coincident with the frequency used by FeliCa gives rise to the problem of mutual interference, and may also end up destroying circuits used for FeliCa. While the amount of transmitted power in FeliCa is in the order of micro watts, power transmission for charging purposes may require as large power as several watts. There is a difference by several orders of magnitude. It is possible to provide newly manufactured apparatuses with a mechanism to switch between the power transmission system and the FeliCa system. However, existing FeliCa apparatuses are not provided with such a protective mechanism. It is thus not feasible to use the frequency coincident with the frequency used by FeliCa. Further, it is difficult to create an amplifier that generates an alternating current magnetic field at high frequency. In general, a frequency lower than 13.56 MHz that is the frequency used by FeliCa may preferably be used for non-contact power feeding In portable apparatuses such as portable phones, a large number of functions are implemented within a limited space, so that space conservation is extremely important. When both the FeliCa function and the non-contact power feeding function are implemented, thus, the antenna coil for FeliCa and the antenna coil for non-contact power feeding are preferably arranged in an overlapping manner at the same place, rather than being arranged at different places. Alternatively, the antenna coil for FeliCa and the antenna coil for non-contact power feeding may be implemented as a single shared coil. In this case, however, the frequency characteristics of the magnetic shield become a problem.

The magnetic shield disposed behind the coil for the FeliCa and non-contact power feeding purposes may need to have high permeability and low magnetic loss at both the frequency used by FeliCa and the frequency used by the non-contact power feeding. Generally, however, no magnetic shield exists that has frequency characteristics exhibiting high permeability and low magnetic loss over all frequencies. What causes magnetism is a magnetic moment created by rotational movement of en electron. When a low-frequency alternating-current magnetic field is applied to a magnetic material, the movement of magnetic moments follows the changes of the magnetic field, thereby providing high permeability (i.e., the real part thereof). As the frequency of the alternating current magnetic field applied to the magnetic material is increased, the magnetic moments gradually fail to follow the changes of the magnetic field, resulting in a decrease in permeability (i.e., the real part thereof) and an increase in magnetic loss (i.e., the imaginary part of permeability). When the frequency is further increased, the magnetic moments stop moving by completely failing to follow the high frequency, resulting in both permeability and magnetic loss being decreased. Accordingly, a magnetic material exhibiting high permeability at high frequency is hard to exist. It is difficult to develop an ideal magnetic shield that has high permeability over all frequency ranges.

The permeability of magnetic material decreases as frequency increases above the magnetic resonance frequency. A relationship (i.e., Snoek's limit) exists between the magnetic resonance frequency and permeability, i.e., the lower the permeability, the higher the magnetic resonance frequency is. In the case of a magnetic shield having a relatively high permeability, thus, the magnetic resonance frequency is low, and permeability starts to drop with an increase in magnetic loss in a relatively low frequency range. In the case of a magnetic shield having a relatively low permeability, the magnetic resonance frequency is high, and permeability starts to drop with an increase in magnetic loss in a relatively high frequency range.

A magnetic shield used for non-contact power feeding in low frequencies may be required to have an extremely high permeability in order to cause a strong magnetic field for non-contact power feeding to be fully circulated. Such a magnetic shield having high permeability, however, has a low magnetic resonance frequency, which means that permeability in a high frequency range used by FeliCa or the like is significantly lowered. Conversely, an attempt to secure a reasonable permeability in high frequencies used by FeliCa or the like ends up employing a magnetic shield having a high magnetic resonance frequency. In this case, a sufficiently high permeability that can completely circulate the strong magnetic field for non-contact power feeding is not provided.

Patent Document 1 discloses a configuration in which a power-purpose coil unit and a signal-purpose coil unit are arranged side by side, and two magnetic shield plates are disposed between the power-purpose coil unit and the signal-purpose coil unit. In this configuration, there is a risk of undermining accurate signal transmission when a magnetic field leaking from the power-purpose coil unit interferes with magnetic signals generated by the signal-purpose coil unit. Because of this, the two magnetic shield plates are provided between the power-purpose coil unit and the signal-purpose coil unit to remove or alleviate the effect of leaked magnetic flux. One of the magnetic shield plates is made of a conductive material having large eddy current loss, i.e., having low electrical resistivity. The other one of the magnetic shield plates is made of a high-permeability material effectively absorbing magnetic flux, such as soft magnetic material like Mn—Zn ferrite. These two magnetic shield plates are for the purpose of reducing the effect of noise made by the power-purpose coil unit on the signal-purpose coil unit, and are not for the purpose of providing a proper shield in different frequencies that are used for the power purpose and for the signal purpose, respectively. Further, the magnetic shield plates made of conductive material are not fit for actual use because its eddy current loss is undesirably large in high frequencies that are supposed to be used in non-contact power feeding used at present.

RELATED-ART DOCUMENTS

Patent Document

[Patent Document 1] Japanese Patent Application Publication No. 8-241386

SUMMARY

According to an aspect of the embodiment, a portable apparatus includes a case, a coil situated inside the case, a circuit disposed inside the case to receive power based on a first frequency via the coil and to perform communication based on a second frequency higher than the first frequency, and a magnetic shield having a first portion and a second portion stacked one over another in a direction perpendicular to the coil between the coil and an inside of the case, the second portion being closer to the coil than the first portion, wherein permeability of the first portion is higher than permeability of the second portion situated toward the coil with respect to the first frequency.

According to an aspect of the embodiment, a feed system includes a power transmission apparatus and a portable apparatus to which power is transmitted via magnetism from the power transmission apparatus, wherein the portable apparatus includes a case, a coil situated inside the case, a circuit disposed inside the case to receive power based on a first frequency from the power transmission apparatus via the coil and to perform communication based on a second frequency higher than the first frequency, and a magnetic shield having a first portion and a second portion stacked one over another in a direction perpendicular to the coil between the coil and an inside of the case, the second portion being closer to the coil than the first portion, wherein permeability of the first portion is higher than permeability of the second portion with respect to the first frequency.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

In the following, embodiments of the invention will be described with reference to the accompanying drawings.

Figure 1:
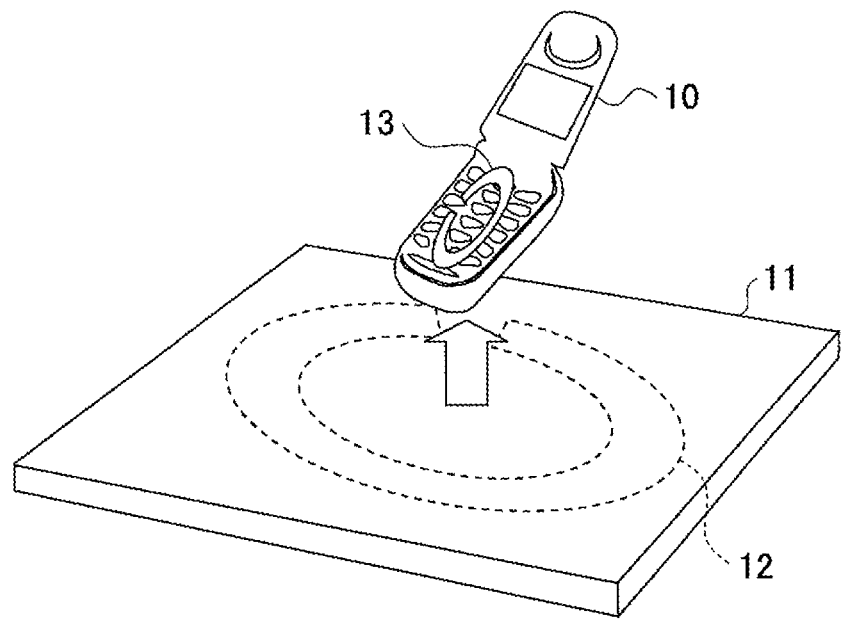
FIG. 1 is a drawing illustrating an outline of the system for feeding power to a portable apparatus.

FIG. 1 is a drawing illustrating an outline of the system for feeding power to a portable apparatus. A portable apparatus 10 may be a portable phone, for example, or may be a persona digital assistance (PDA), a portable music player, or the like. The portable apparatus 10 receives power from a power transmission apparatus 11 through an alternating current magnetic field of predetermined frequency. As illustratively depicted in FIG. 1, the power transmission apparatus 11 includes a power-transmission-purpose coil 12, and the portable apparatus 10 includes a power-reception-purpose coil 13. The coil 12 and the coil 13 are connected to resonance-purpose condensers, respectively. It is known that the use of the same resonance frequency for the power transmission purpose at the power transmission apparatus 11 side and at the portable apparatus 10 side causes the transmission side and the reception side to be resonance-coupled to each other, thereby achieving highly-efficient power transmission over a relatively long distance. In the feed system illustrated in FIG. 1, resonance coupling may not be used. When resonance coupling is not used, power is transmitted by placing the portable apparatus 10 and the power transmission apparatus 11 at such a close distance to each other as to be physically in contact. The power received from the power transmission apparatus 11 is charged in the battery provided inside the portable apparatus 10. This battery functions as a power supply to drive the portable apparatus 10.

Figure 2:
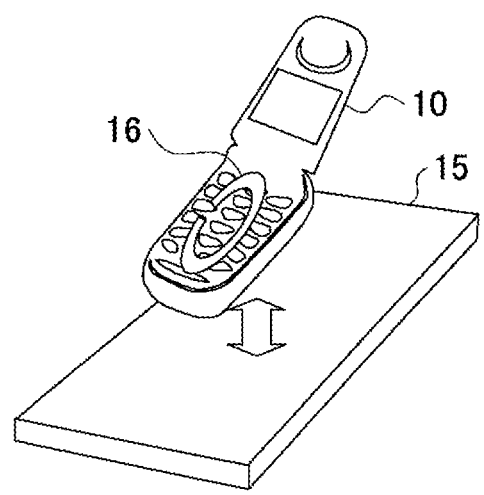
FIG. 2 is a drawing illustrating a system in which communication is conducted with the portable apparatus through electromagnetic induction.

FIG. 2 is a drawing illustrating a system in which communication is conducted with the portable apparatus through electromagnetic induction. The portable apparatus 10 communicates with a card reader and writer 15 through an alternating current magnetic field (or electromagnetic wave) of predetermined frequency. For example, communication is conducted in conformity with the FeliCa specifications. As illustratively depicted in FIG. 2, the portable apparatus 10 includes a coil 16 serving as a communication-purpose antenna. Signals are exchanged through electromagnetic induction between the antenna at the power transmission apparatus 11 side and the coil 16 of the portable apparatus 10, thereby exchanging information. In so doing, the power required for the portable apparatus 10 to operate may be supplied from the internal battery as previously described. It may be noted that as a general rule, the feed system (i.e., charge system) illustrated in FIG. 1 and the communication system illustrated in FIG. 2 are not used simultaneously.

Figure 3:
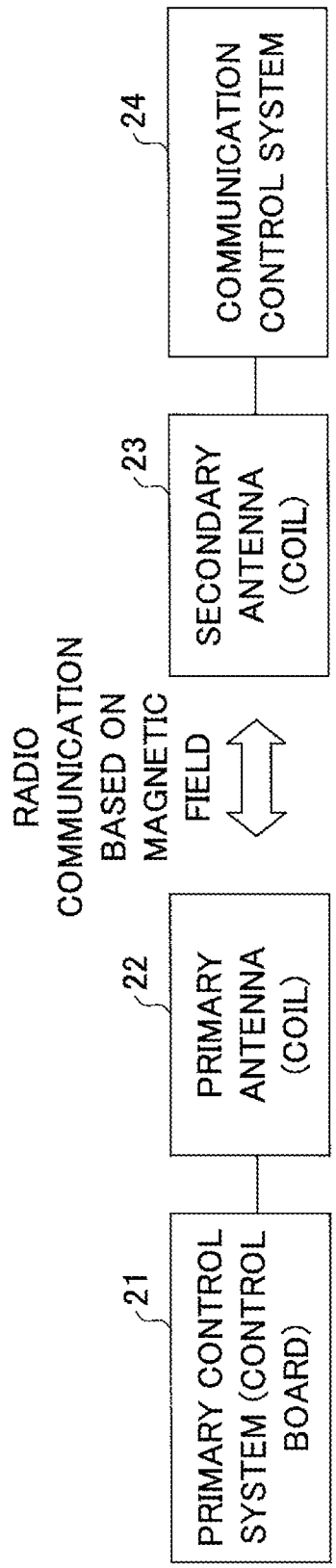
FIG. 3 is a drawing illustrating the functional configuration of the communication system of FIG. 2.

FIG. 3 is a drawing illustrating the functional configuration of the communication system of FIG. 2. The communication system includes a primary control system (control board) 21, a primary antenna 22, a secondary antenna 23, and a communication control system 24. The primary control system 21 and the primary antenna 22 are provided at the card reader and writer 15 side, and the secondary antenna 23 and the communication control system 24 are provided at the portable apparatus 10 side. The secondary antenna 23 corresponds to the coil 16 of FIG. 2. The primary control system 21 modulates data and commands to be transmitted to the portable apparatus 10, and transmits the obtained modulated signals through the primary antenna 22. The communication control system 24 demodulates the modulated signals received through the secondary antenna 23, and performs operations based on data and commands obtained by such demodulation. The communication control system 24 modulates data to be transmitted, and transmits the modulated signals through the secondary antenna 23.

Figure 4:
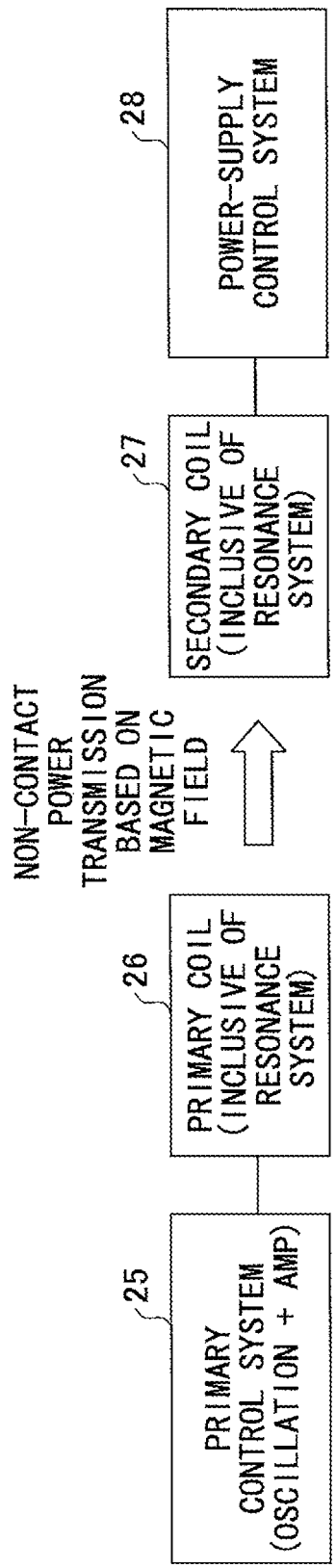
FIG. 4 is a drawing illustrating the functional configuration of the feed system of FIG. 1.

FIG. 4 is a drawing illustrating the functional configuration of the feed system of FIG. 1. The feed system includes a primary control system (oscillator and amplifier) 25, a primary coil 26, a secondary coil 27, and a power-supply control system 28. The primary control system 25 and the primary coil 26 are provided at the power transmission apparatus 11 side, and the primary coil 26 and the secondary coil 27 are provided at the portable apparatus 10 side. The primary coil 26 corresponds to the coil 12 of FIG. 1, and the secondary coil 27 corresponds to the coil 13 of FIG. 1. The primary control system 25 uses an oscillator to generate an oscillating signal of predetermined frequency, and uses an amplifier for amplification, followed by supplying the amplified oscillating signal to the primary coil 26. The primary coil 26 constitutes a resonance system inclusive of an inductor and a capacitor, and the secondary coil 27 also constitutes a resonance system inclusive of an inductor and a capacitor. The resonance frequency of the resonance system of the primary coil 26 is the same as the resonance frequency of the resonance system of the secondary coil 27, which enables efficient power transmission over some distance. The power-supply control system 28 rectifies an induced current generated at the secondary coil 27, and performs DC-DC conversion to generate a constant direct-current voltage, which is used to charge the internal power supply (i.e., battery).

When power is transmitted through non-contact power feeding by use of the system illustrated in FIG. 1 and FIG. 4, the use of frequency coincident with the frequency used by the communication system such as FeliCa or the like illustrated in FIG. 2 and FIG. 3 poses a risk of creating interference, destroying circuits, and so on as previously described. It is thus not feasible to use, for power transmission, a frequency coincident with the frequency used by the communication system. Further, it is difficult to design an amplifier that generates an alternating current magnetic field at high frequency. Accordingly, it is preferable to use, for non-contact power feeding, a frequency lower than (e.g., lower than 2 MHz) the frequency used by the communication system (which is 13.56 MHz in the case of FeliCa, for example).

Figure 5:
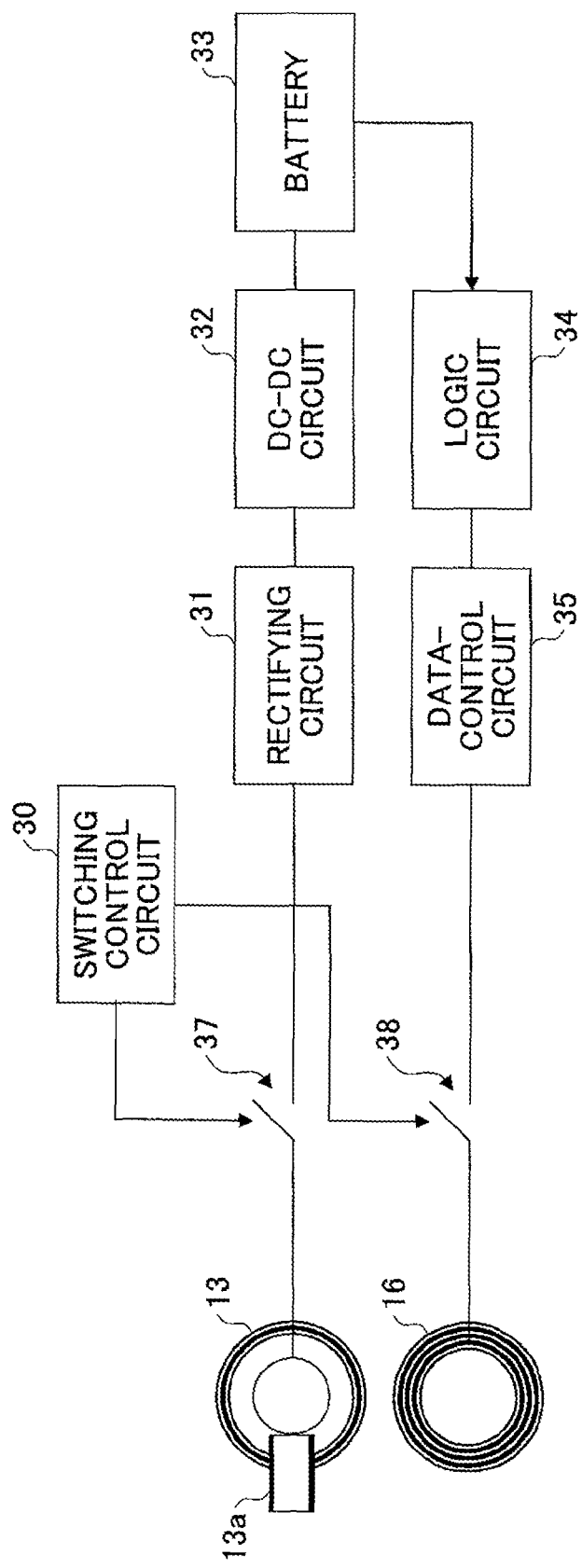
FIG. 5 is a drawing illustrating an example of the configuration of a communication-purpose coil and control system as well as a power-transmission-purpose coil and control system provided inside the portable apparatus.

FIG. 5 is a drawing illustrating an example of the configuration of the communication-purpose coil and control system as well as the power-transmission-purpose coil and control system provided inside the portable apparatus 10. The circuits of the power control system and the communication control system include a switching control circuit 30, a rectifying circuit 31, a DC-DC circuit 32, a logic circuit 34, and a data-control circuit 35. In FIG. 5 and the subsequent drawings, boundaries between circuits illustrated as blocks (boxes) basically indicate functional boundaries, and may not correspond to separation in terms of physical positions, separation in terms of electrical signals, separation in terms of control logic, etc. Each block may be a circuit or hardware module that is physically separated from other blocks to some extent, or may indicate a function in a circuit or hardware module in which this and other blocks are physically combined together. For the convenience of illustration in FIG. 5, the coil 13 and the coil 16 are illustrated as being situated at their respective placement positions. In reality, however, they are arranged in such a manner as to overlap each other at least partially as will be described later.

The rectifying circuit 31 and the DC-DC circuit 32 constitute the power control system, and control the power that is received via the resonance-system coil 13 inclusive of a condenser 13a in addition to the coil 13. Specifically, this received power is used to supply a direct-current voltage to a battery 33 for charging. The battery 33 is used as a power supply to drive each circuit such as the switching control circuit 30, the logic circuit 34, the data-control circuit 35, and the like. In FIG. 5, only the supply of power from the battery 33 to the logic circuit 34 is illustrated by an arrow for the sake of easy-to-view illustration. The logic circuit 34 and the data-control circuit 35 constitute the communication control system, and perform communication control based on signals received via the coil 16.

The switching control circuit 30 turns on either one of switches 37 and 38, thereby coupling only one of the communication control system and the power control system to a corresponding coil. For example, the switch 37 is normally opened and the switch 38 is closed, so that only the communication control system is connected to the coil 16, thereby maintaining a communication-ready state. At the time of charging, the switch 37 is opened and the switch 38 is closed, so that only the power control system is connected to the coil 13, thereby maintaining a power-reception-ready state. Frequencies used by the power transmission system and the communication system may be different from each other, so that there is no risk of interference, circuit destruction, or the like. In such a case, the switching control circuit 30 and the switches 37 and 38 may not be provided, and the coils 13 and 16 may permanently be connected to the power control system and the communication system, respectively.

Power received by the coil 13 is supplied to the rectifying circuit 31 as an alternating current voltage. The rectifying circuit 31 rectifies the alternating current voltage supplied from the coil 13 to generate a direct current voltage. The direct current voltage generated by the rectifying circuit 31 is supplied as a charge voltage to the battery 33 via the DC-DC circuit 32. The DC-DC circuit 32 includes a smoothing-purpose capacitor and a voltage-adjustment-purpose circuit, and has a function to supply a predetermined direct current voltage in a stable manner.

The logic circuit 34 controls communication operations. The data-control circuit 35 produces a data signal demodulated from a modulated signal supplied from the antenna coil 16. The demodulated data signal is supplied to the logic circuit 34. The data-control circuit 35 also modulates a data signal from the logic circuit 34, and supplies the modulated signal to the antenna coil 13. In this manner, data communication with the card reader and writer 15 of FIG. 2 is conducted.

Figure 6:
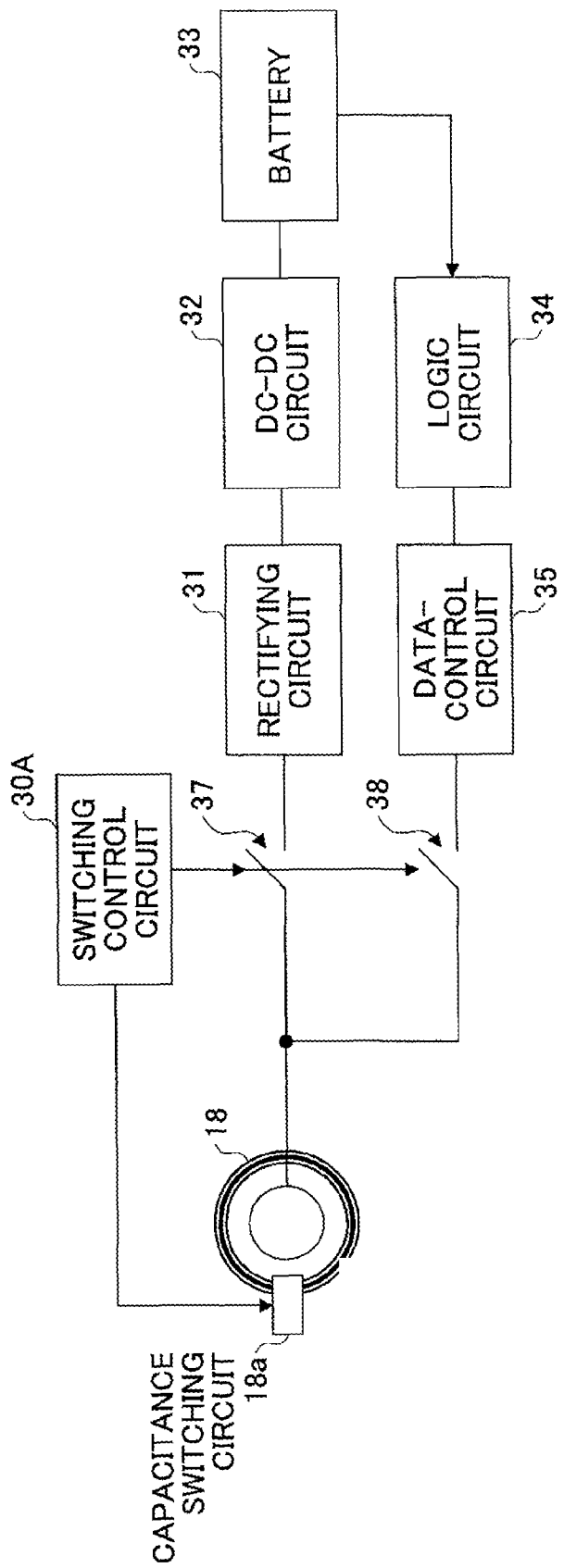
FIG. 6 is a drawing illustrating another example of the configuration of a communication-purpose coil and control system as well as a power-transmission-purpose coil and control system provided inside the portable apparatus.

FIG. 6 is a drawing illustrating another example of the configuration of the communication-purpose coil and control system as well as the power-transmission-purpose coil and control system provided inside the portable apparatus 10. The same elements as those of FIG. 5 are referred to by the same numerals, and a description thereof will be omitted. In FIG. 6, a shared coil 18 is used for the communication purpose and for the power transmission purpose in place of the power-transmission-purpose coil 13 and the communication-purpose coil 16 illustrated in FIG. 5. As a result of the provision of the shared coil 18, a switching control circuit 30A is provided in place of the switching control circuit 30 of FIG. 5. The switching control circuit 30A controls a capacitance switching circuit 18a to switch resonance-purpose condensers connected to the shared coil 18 (or change the capacitance of the condenser). At the time of communication, the switching control circuit 30A removes a resonance-purpose condenser (or sets the capacitance of the condenser to zero), thereby causing the shared coil 18 to be used as a communication-purpose antenna coil. At the time of power transmission, the switching control circuit 30A attaches a condenser (or sets the capacitance of the condenser) such as to achieve the same resonance frequency as the transmission side, thereby causing the shared coil 18 to be used as a power-transmission-purpose coil. Further, as in the case illustrated in FIG. 5, the switching control circuit 30A normally opens the switch 37 and closes the switch 38, so that only the communication control system is connected to the coil 18, thereby maintaining a communication-ready state. At the time of charging, the switch 37 is opened and the switch 38 is closed, so that only the power control system is connected to the coil 13, thereby maintaining a power-reception-ready state.

Figure 7:
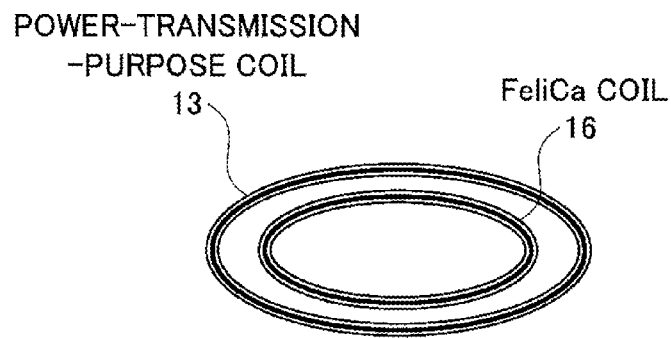
FIG. 7 is a drawing illustrating an example of a specific arrangement of the power-transmission-purpose coil and the communication-purpose coil.

FIG. 7 is a drawing illustrating an example of a specific arrangement of the power-transmission-purpose coil and the communication-purpose coil. In FIG. 7, the same elements as those of FIG. 5 are referred to by the same numerals. As illustrated in FIG. 7, the power-transmission-purpose coil 13 and the communication-purpose coil 16 may be placed to overlap each other in a predetermined coil placement area provided in the portable apparatus 10. In the example illustrated in FIG. 7, the power-transmission-purpose coil 13 and the communication-purpose coil 16 having the same center point overlap each other in a concentric manner. As a result of this arrangement, the power-transmission-purpose coil 13 and the communication-purpose coil 16 can be accommodated in a placement space for a single coil, thereby achieving space conservation. In portable apparatuses such as portable phones, a large number of functions are implemented within a limited space, so that it is preferable to use an arrangement that achieves this kind of space conservation. Instead of using a fully overlapping arrangement in which the centers of coils coincide with each other as illustrated in FIG. 7, the centers of the coils may deviate from each other, so that the coils may overlap each other at least partially. Even in such a case, space conservation is achieved with respect to the overlapping portion.

Figure 8:
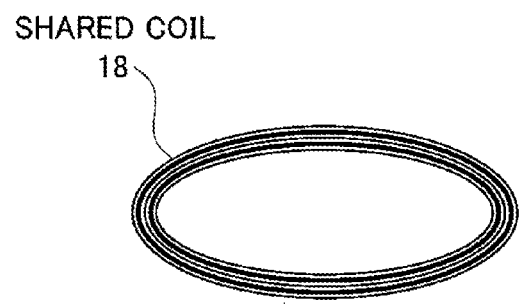
FIG. 8 is a drawing illustrating another example of a specific arrangement of the power-transmission-purpose coil and the communication-purpose coil.

FIG. 8 is a drawing illustrating another example of a specific arrangement of the power-transmission-purpose coil and the communication-purpose coil. In the example illustrated in FIG. 8, the single coil 18 is disposed, rather than disposing a power-transmission-purpose coil and a communication-purpose coil as separate coils, and this single coil 18 is used for both the power transmission purpose and the communication purpose. The provision of the single shared coil 18 not only entails space conservation due to the use of a placement space for only a single coil, but also provides other advantages such as cost reduction and weight reduction.

As illustrated in FIG. 7 or FIG. 8, the predetermined coil placement area accommodates the power-transmission-purpose and communication-purpose coils or the shared coil. In such a case, a magnetic shield suitable for both the power-transmission-purpose frequencies and the communication-purpose frequencies may need to be provided in the coil placement area. In the following, a description will be given of the configuration of such a magnetic shield.

Figure 9:
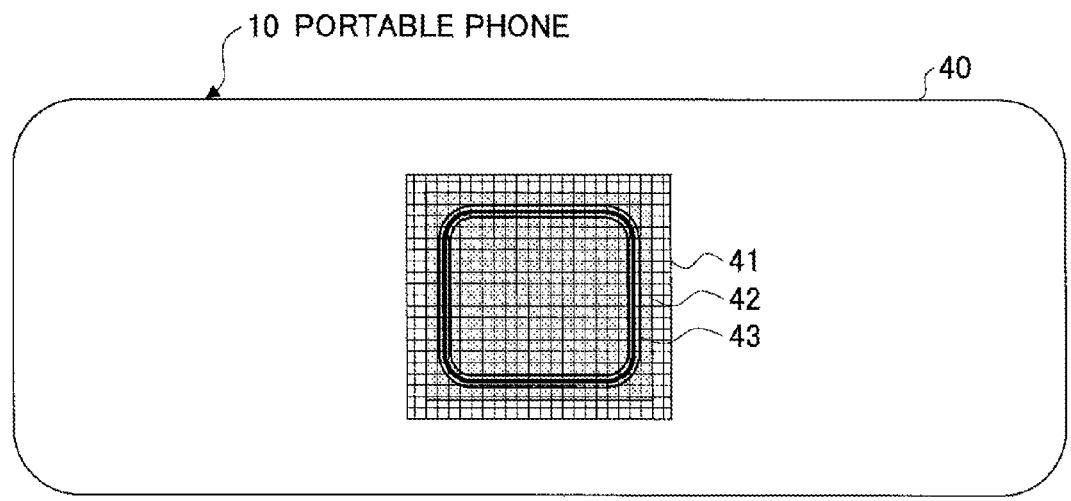
FIG. 9 is a drawing illustratively depicting the arrangement of a coil and magnetic shields in a portable phone.
Figure 10:
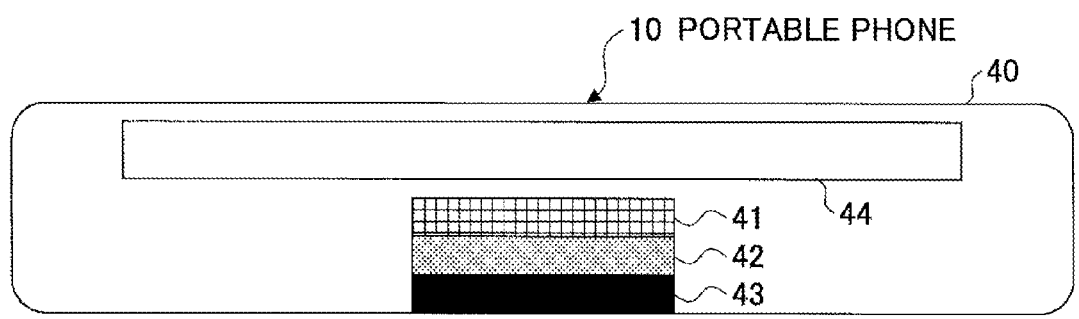
FIG. 10 is a cross-sectional view of the portable phone illustrating the arrangement of the coil and the magnetic shields.

FIG. 9 is a drawing illustratively depicting the arrangement of a coil and magnetic shields in a portable phone. FIG. 10 is a cross-sectional view of the portable phone illustrating the arrangement of the coil and the magnetic shields. In FIG. 10, a first magnetic shield 41, a second magnetic shield 42, and a coil 43 are disposed in a case 40 of the portable apparatus 10 in this order from the center of the inside to the exterior of the case 40. Further, an internal circuit 44 is accommodated in the case 40. The internal circuit 44 may include a circuit board, circuit elements on the circuit board, a battery, and so on. The internal circuit 44 may further include a display device such as a liquid crystal display panel. As illustrated in FIG. 9, when the portable apparatus 10 is viewed from the bottom, the coil 43 is disposed only in a placement area that is part of the entire bottom surface area of the case 40. Accordingly, other areas of the bottom surface of the case 40 may be used for the provision of other functions such as infrared communication, a CCD camera, a small liquid crystal display window, etc.

The coil 43 may include a power-transmission-purpose coil and a communication-purpose coil that are placed to overlap each other, or may be a single shared coil. The coil 43 is situated towards the exterior of the case 40 (i.e., towards the bottom surface of the case 40 in the example illustrated in FIG. 10) with respect to the case 40 of the portable apparatus 10. The phrase "the coil 43 is situated towards the exterior of the case 40" means that the coil 43 is situated nearer to the exterior of the case 40 than are the interior circuits inside the case 40 and the magnetic shields 41 and 42, and does not mean that the coil 43 is situated on the exterior surface of the case 40. Needless to say, the coil 43 is disposed at a position close to the exterior of the case 40 in order to communicate with the card reader and writer 15 illustrated in FIG. 1 or the like. In order to prevent the coil 43 from being exposed, the surface of the coil 43 is covered by the case 40 or another material different from the case 40.

As previously described, a first frequency for the power transmission purpose is preferably lower than (e.g., lower than 2 MHz) a second frequency for the communication purpose (which is 13.56 MHz in the case of FeliCa, for example). When taking into account the efficiency (Q factor) of the resonance circuit, a relatively high frequency provides satisfiable efficiency. A frequency of around 1 to 2 MHz is suitable for practical use as the first frequency for the power transmission purpose. The internal circuit 44 provided inside the case 40 may include a circuit that receives power based on the first frequency via the coil 43 and that performs communication based on the second frequency. To be specific, this circuit includes the rectifying circuit 31, the DC-DC circuit 32, the logic circuit 34, the data-control circuit 35, and the like illustrated in FIG. 5 and FIG. 6, for example.

The magnetic shield is disposed between the coil 43 and the inside of the case 40. This magnetic shield has a first portion (e.g., the first magnetic shield 41) situated towards the center of the inside, whose permeability is higher than the permeability of a second portion (e.g., the second magnetic shield 42) situated towards the coil. The magnetic shield may be formed of two sheets having different properties (i.e., permeability values) such as the first magnetic shield 41 and the second magnetic shield 42, or may be a single sheet into which two sheets having different properties (i.e., permeability values) are merged when they are tightly adhered to each other in such a manner as to have a blurred boundary. Alternatively, the magnetic shield may be configured such that the property (i.e., permeability value) of a single sheet changes continuously or in a stepwise manner from one surface to the other surface. Alternatively, the magnetic shield may be configured such that three or more sheets having different properties (i.e., permeability values) are sequentially arranged, or may be a single sheet into which these sheets are merged when they are tightly adhered to each other in such a manner as to have a blurred boundary. In this manner, the magnetic shield disposed between the coil 43 and the center of the inside of the case 40 suffices regardless of its structure as long as the first portion situated towards the center of the inside has permeability higher than the permeability of the second portion situated towards the coil.

Figure 11:
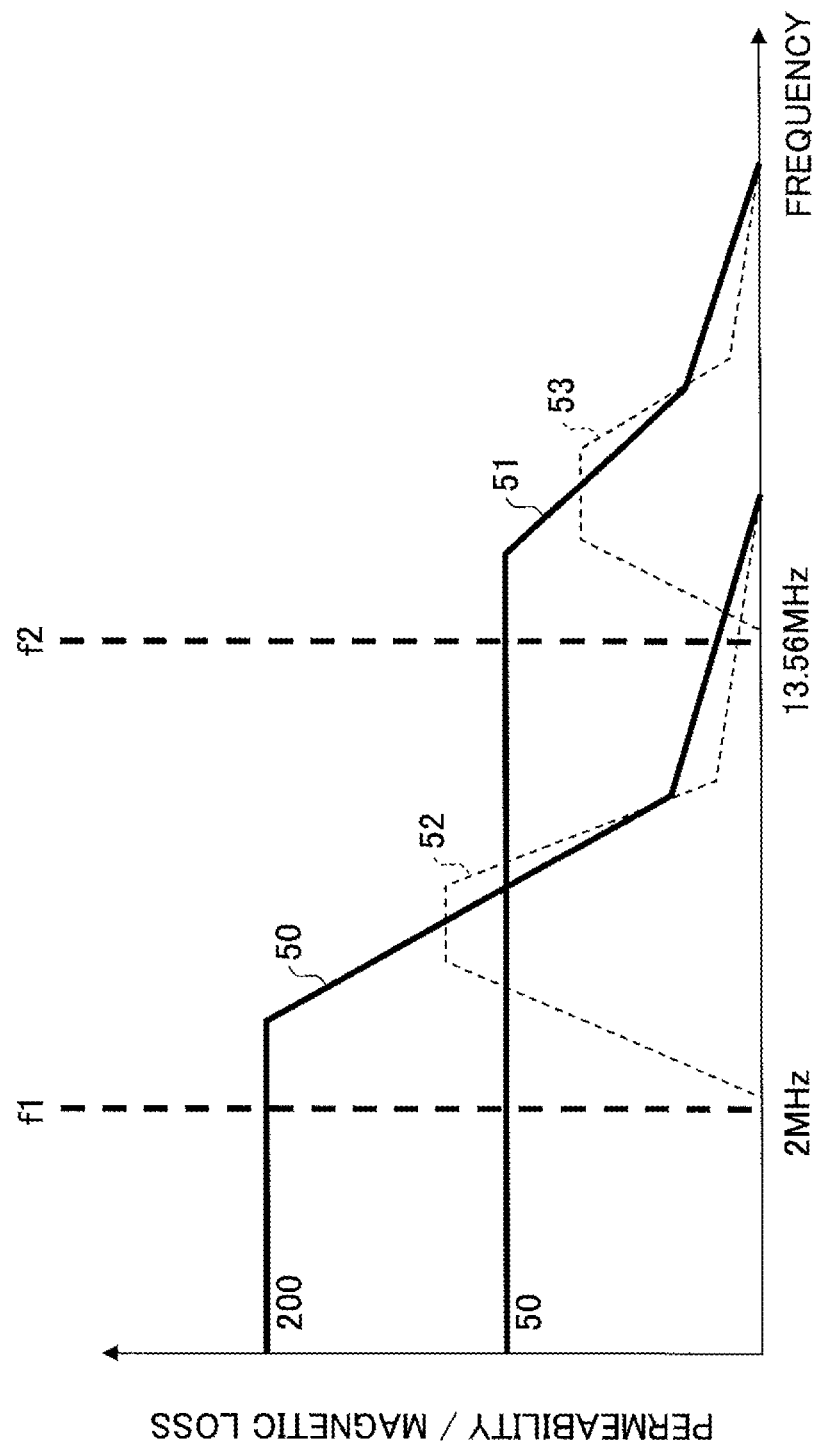
FIG. 11 is a drawing illustrating the magnetic characteristics of the first magnetic shield and the second magnetic shield.

FIG. 11 is a drawing illustrating the magnetic characteristics of the first magnetic shield 41 and the second magnetic shield 42. In FIG. 11, the horizontal axis represents frequency, and the vertical axis represents permeability (i.e., the real part of permeability) and magnetic loss (i.e., the imaginary part of permeability). As was previously described, when a low-frequency alternating-current magnetic field is applied to a magnetic material, the movement of magnetic moments follows the changes of the magnetic field, thereby providing high permeability (i.e., the real part thereof). As the frequency of the alternating current magnetic field applied to the magnetic material is increased, the magnetic moments gradually fail to follow the changes of the magnetic field, resulting in a decrease in permeability (i.e., the real part thereof) and an increase in magnetic loss (i.e., the imaginary part of permeability). When the frequency is further increased, the magnetic moments stop moving by completely failing to follow the high frequency, resulting in both permeability and magnetic loss being decreased. The permeability of magnetic material decreases as frequency increases above the magnetic resonance frequency. A relationship (i.e., Snoek's limit) exists between the magnetic resonance frequency and permeability, i.e., the lower the permeability, the higher the magnetic resonance frequency is. In the case of a magnetic shield having a relatively high permeability, thus, the magnetic resonance frequency is low, and permeability starts to drop with an increase in magnetic loss in a relatively low frequency range. In the case of a magnetic shield having a relatively low permeability, the magnetic resonance frequency is high, and permeability starts to drop with an increase in magnetic loss in a relatively high frequency range.

In FIG. 11, permeability characteristics 50 and magnetic loss characteristics 52 are the characteristics of the first magnetic shield 41, and permeability characteristics 51 and magnetic loss characteristics 53 are the characteristics of the second magnetic shield 42. The first magnetic shield 41 has a high permeability of around 200 in low frequencies, and maintains this high permeability at a power-transmission-purpose frequency f1 that may be 2 MHz, for example. The magnetic resonance frequency of the first magnetic shield 41 having high permeability is low, and permeability starts to drop with an increase in magnetic loss in a relatively low frequency range. In the example illustrated in FIG. 11, the permeability characteristics 50 starts to drop above around 2 MHz, with an increase in the magnetic loss characteristics 52. At a communication-purpose frequency f2 (which is 13.56 MHz in the case of FeliCa, for example), the permeability of the first magnetic shield 41 is low, and magnetic loss is in existence that is not negligible. Accordingly, the first magnetic shield 41 is suitable as a power-transmission-purpose shield in the sense of having a function to guide the magnetic field of the power-transmission-purpose frequency f1 without incurring magnetic loss, but is not suitable as a communication-purpose shield because of the loss with respect to the magnetic field of the communication-purpose frequency f2. It may be noted that, in general, the magnetic resonance frequency of magnetic material exists at a frequency that is slightly lower than the frequency at which the permeability of the magnetic shield starts to drop (e.g., around 2 MHz in the case of the permeability characteristics 50).

The second magnetic shield 42 has a mid-level permeability of around 50 in low frequencies, and exhibits this mid-level permeability at the power-transmission-purpose frequency f1 that may be 2 MHz, for example. The magnetic resonance frequency of the second magnetic shield 42 having such a mid-level permeability is not so low (higher than the magnetic resonance frequency of the first magnetic shield 41), so that the mid-level permeability is desirably maintained up to certain frequencies. In the example illustrated in FIG. 11, the mid-level permeability is maintained at the communication-purpose frequency f2 (which is 13.56 MHz in the case of FeliCa, for example). Above that point, the permeability characteristics 51 of the second magnetic shield 42 drops, with an increase in the magnetic loss characteristics 53. Accordingly, the second magnetic shield 42 is suitable as a communication-purpose shield in the sense of having a function to guide the magnetic field of the communication-purpose frequency f2 without incurring magnetic loss, but is not suitable, with a mediocre permeability of around 50, as a power-transmission-purpose shield that is required to guide the strong power-transmission-purpose magnetic field of the frequency f1.

It may be noted that the magnetic characteristics of a magnetic shield depend on material, composition, and the method of making. The material may be Ni ferrite, which may be made by mixing NiO, ZnO, $Fe_2O_3$, and the like in various proportions. Also, a magnetic shield may be used that is made by mixing, into resin, minute strips of metallic magnetic material that are made thinner than the thickness of the surface skin. Further, as parameters relating to the method of making, the diameters of particles of the material (i.e., the smallness or size variation of powder particles before sintering) may be controlled, or the temperature and time of sintering may be controlled, thereby adjusting the magnetic characteristics of the magnetic shield.

Figure 12:
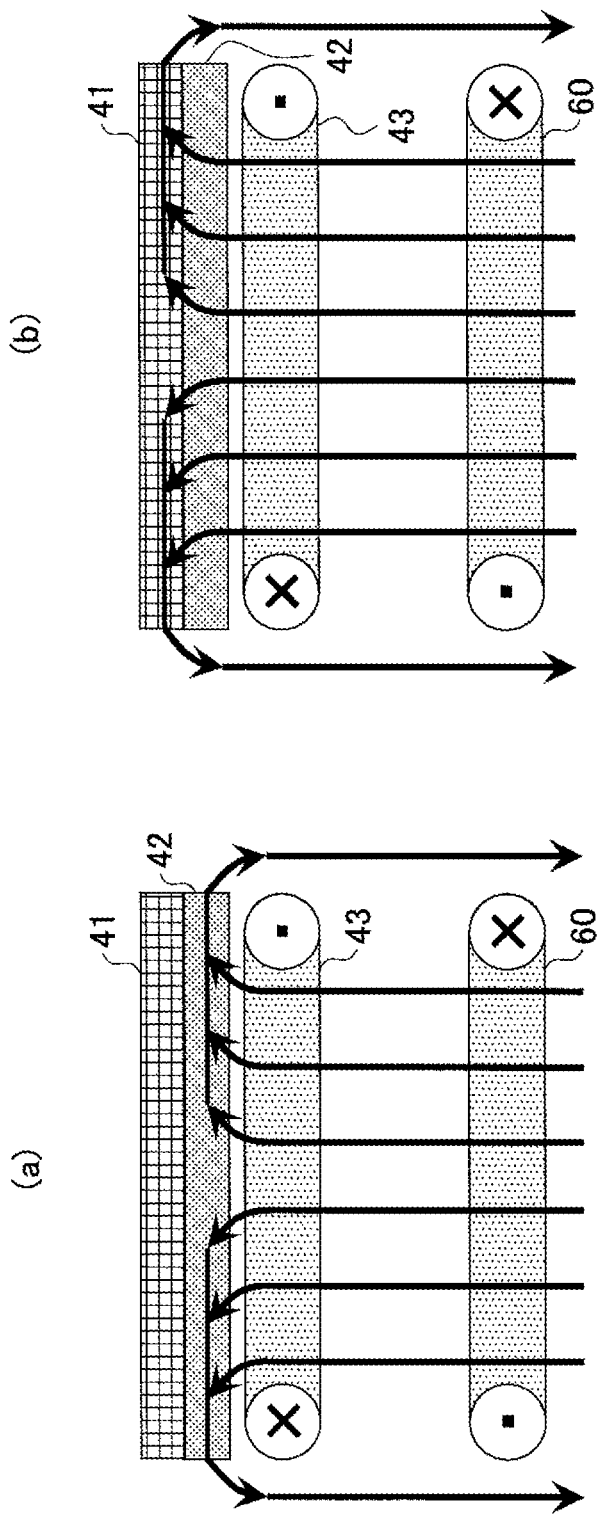
FIG. 12 is a drawing illustrating the shielding effect of a specific arrangement of the first magnetic shield and the second magnetic shield.

FIG. 12 is a drawing illustrating the shielding effect of the specific arrangement of the first magnetic shield 41 and the second magnetic shield 42. As was previously described, in the portable apparatus 10 illustrated in FIG. 10, the first magnetic shield 41 having relatively high permeability is situated toward the center of the inside of the case 40, and the second magnetic shield 42 having relatively low permeability is situated toward the coil 43 (i.e., close to the exterior of the case 40). In FIGS. 12(a) and (b), a coil 60 is the coil that is disposed in the card reader and writer or at the power transmission side outside the case 40. The first magnetic shield 41 and the second magnetic shield 42 have the permeability characteristics and the magnetic loss characteristics as described in connection with FIG. 11.

FIG. 12(a) illustratively depicts the flow of magnetic flux of an alternating current magnetic field of the communication-purpose frequency f2 illustrated in FIG. 11. As was previously described, the second magnetic shield 42 is suitable as a communication-purpose shield in the sense of having a function to guide the magnetic field of the communication-purpose frequency f2 without incurring loss. The magnetic flux indicated by arrows in FIG. 12(a) thus flows along the second magnetic shield 42 without suffering loss, and forms a circulating flow to return to the coil 60 without loss. The first magnetic shield 41 is disposed behind the second magnetic shield 42 as viewed from the coil 43, and, thus, does not have any effect on the flow of magnetic field.

FIG. 12(b) illustratively depicts the flow of magnetic flux of an alternating current magnetic field of the power-transmission-purpose frequency f1 illustrated in FIG. 11. As was previously described, the second magnetic shield 42 does not have sufficiently high permeability, and, thus, cannot guide all the power-transmission-purpose strong magnetic field of the frequency f1. On the other hand, the first magnetic shield 41 is suitable as a power-transmission-purpose shield in the sense of having a function to guide the magnetic field of the power-transmission-purpose frequency f1 without incurring loss. Accordingly, the power-transmission-purpose magnetic flux indicated by arrows in FIG. 12(b) has a small portion thereof forming a circulating flow without loss via the second magnetic shield 42, but mostly flows along the first magnetic shield 41 without suffering loss, thereby forming a circulating flow to return to the coil 60 without loss. In this manner, the first magnetic shield 41 and the second magnetic shield 42 exhibit a proper shielding effect against the power-transmission-purpose magnetic field. In other words, while the first magnetic shield 41 exhibits a proper shielding effect against the power-transmission-purpose magnetic field, the second magnetic shield 42 does not incur loss and provides an additional modest shielding effect.

Figure 13:
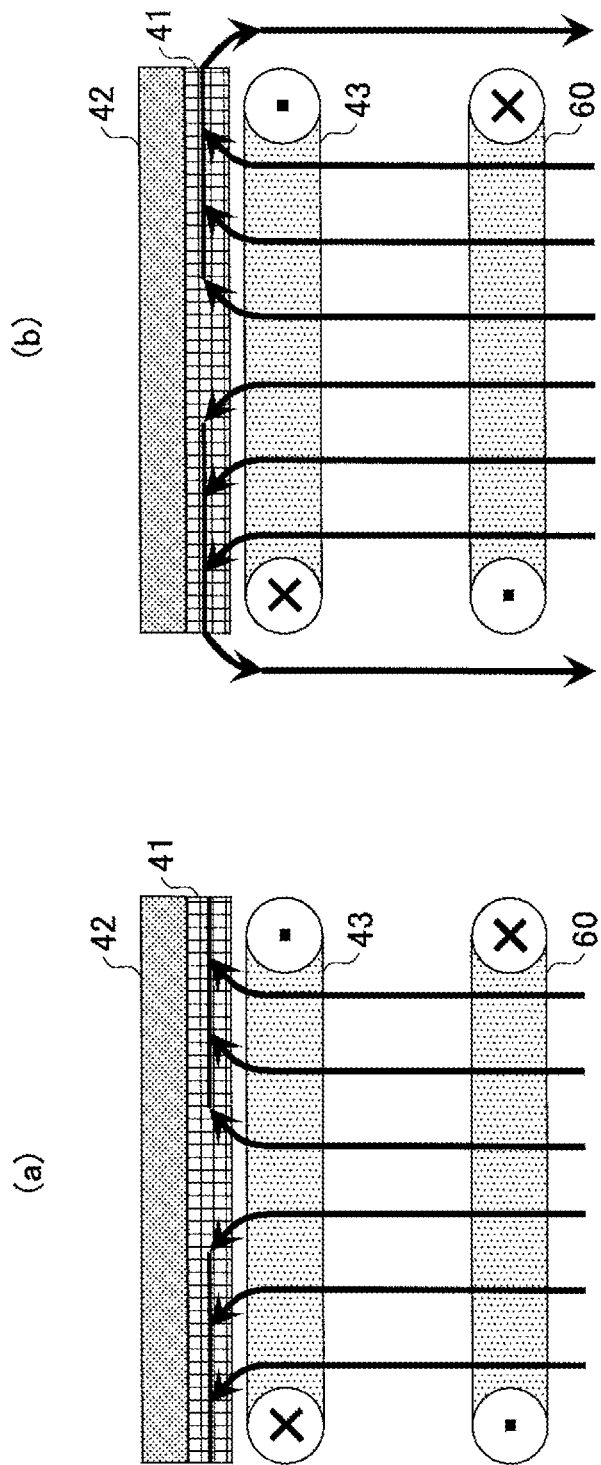
FIG. 13 is a drawing illustrating a shielding effect observed when the positions of the first magnetic shield and the second magnetic shield are swapped.

FIG. 13 is a drawing illustrating a shielding effect observed when the positions of the first magnetic shield 41 and the second magnetic shield 42 are swapped. As illustrated in FIGS. 13(a) and (b), the first magnetic shield 41 is situated towards the coil 43, and the second magnetic shield 42 is situated towards the center of the inside of the case. It may be noted that the first magnetic shield 41 and the second magnetic shield 42 have the permeability characteristics and the magnetic loss characteristics as described in connection with FIG. 11.

FIG. 13(a) illustratively depicts the flow of magnetic flux of an alternating current magnetic field of the communication-purpose frequency f2 illustrated in FIG. 11. As was previously described, the first magnetic shield 41 is not suitable as a communication-purpose shield because of the loss with respect to the magnetic field of the communication-purpose frequency f2. In the arrangement illustrated in FIG. 13(a), the first magnetic shield 41 is situated towards the coil 43. The magnetic flux indicated by arrows in FIG. 13(a) is thus mostly lost due to loss in the first magnetic shield 41, and only partly returns to the transmission-side coil 60. As a result, a significant portion of the signal power transmitted from the transmission-side coil 60 is lost, resulting in the communication having extremely weak signal strength. There may be a possibility of failing to achieve proper communication. It may be noted that FIG. 13(a) illustrates the situation as if the magnetic flux was completely lost due to the loss in the first magnetic shield 41 in order to emphasize the effect of loss.

FIG. 13(b) illustratively depicts the flow of magnetic flux of an alternating current magnetic field of the power-transmission-purpose frequency f1 illustrated in FIG. 11. As was previously described, the first magnetic shield 41 is suitable as a power-transmission-purpose shield in the sense of having a function to guide the magnetic field of the power-transmission-purpose frequency f1 without incurring loss. The power-transmission-purpose magnetic flux indicated by arrows in FIG. 12(b) thus flows along the first magnetic shield 41 without suffering loss, and forms a circulating flow to return to the coil 60 without loss.

In this manner, when the first magnetic shield 41 is situated towards the coil 43, and the second magnetic shield 42 is situated towards the center of the inside of the case, no problem occurs at the time of power transmission, but significant loss is incurred at the time of communication, resulting in the possibility of failing to achieve proper communication. Accordingly, it is preferable to situate the first magnetic shield 41 towards the center of the inside of the case and to situate the second magnetic shield 42 towards the coil 43 as illustrated in FIG. 12.

Figure 14:
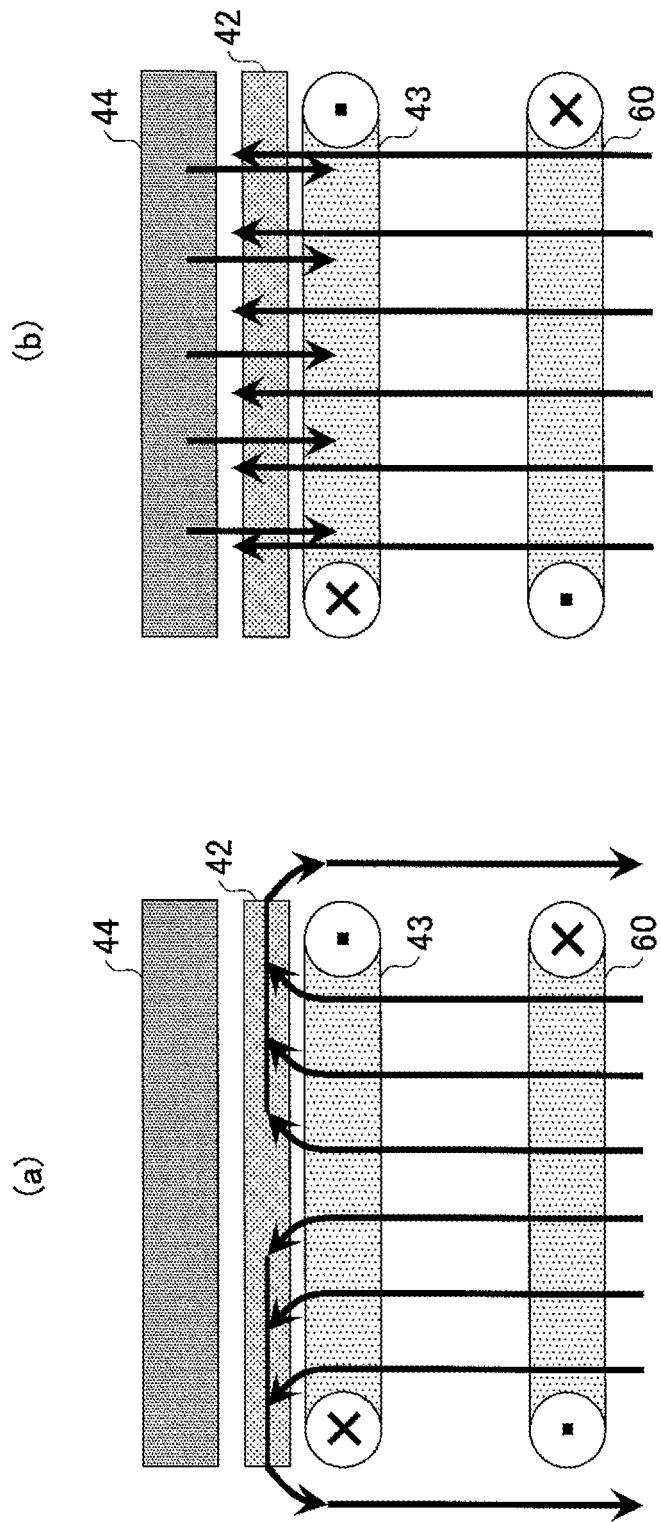
FIG. 14 is a drawing illustrating a shielding effect observed when only the second magnetic shield is disposed for comparison purposes.

FIG. 14 is a drawing illustrating a shielding effect observed when only the second magnetic shield 42 is disposed for comparison purposes. It may be noted that the second magnetic shield 42 has the permeability characteristics and the magnetic loss characteristics as described in connection with FIG. 11.

FIG. 14(a) illustratively depicts the flow of magnetic flux of an alternating current magnetic field of the communication-purpose frequency f2 illustrated in FIG. 11. As was previously described, the second magnetic shield 42 is suitable as a communication-purpose shield in the sense of having a function to guide the magnetic field of the communication-purpose frequency f2 without incurring loss. The magnetic flux indicated by arrows in FIG. 14(a) thus flows along the second magnetic shield 42 without suffering loss, and forms a circulating flow to return to the coil 60 without loss. In this case, the internal circuit 44 is disposed behind the second magnetic shield 42 as viewed from the coil 43, and, thus, does not have any effect on the flow of magnetic field.

FIG. 14(b) illustratively depicts the flow of magnetic flux of an alternating current magnetic field of the power-transmission-purpose frequency f1 illustrated in FIG. 11. As was previously described, the second magnetic shield 42 does not have sufficiently high permeability, and, thus, cannot guide all the power-transmission-purpose strong magnetic field of the frequency f1. In FIG. 12(b), most of the power-transmission-purpose magnetic flux indicated by arrows passes through the second magnetic shield 42 to reach the internal circuit 44. This passing magnetic flux generates eddy currents in metallic materials inside the internal circuit 44. These eddy currents generate a reactive magnetic field as indicated by arrows pointing downward, and also result in power loss caused by eddy current loss. This gives rise to problems such as communication failure and a drop in power feeding efficiency.

In this manner, with the provision of only the second magnetic shield 42, a proper shielding effect is of course provided with respect to the alternating current magnetic field of the communication-purpose frequency f2, but a proper shielding effect is not provided with respect to the alternating current magnetic field of the power-transmission-purpose frequency f1. Accordingly, it is preferable to situate the first magnetic shield 41 towards the center of the inside of the case and to situate the second magnetic shield 42 towards the coil 43 as illustrated in FIG. 12.

Figure 15:
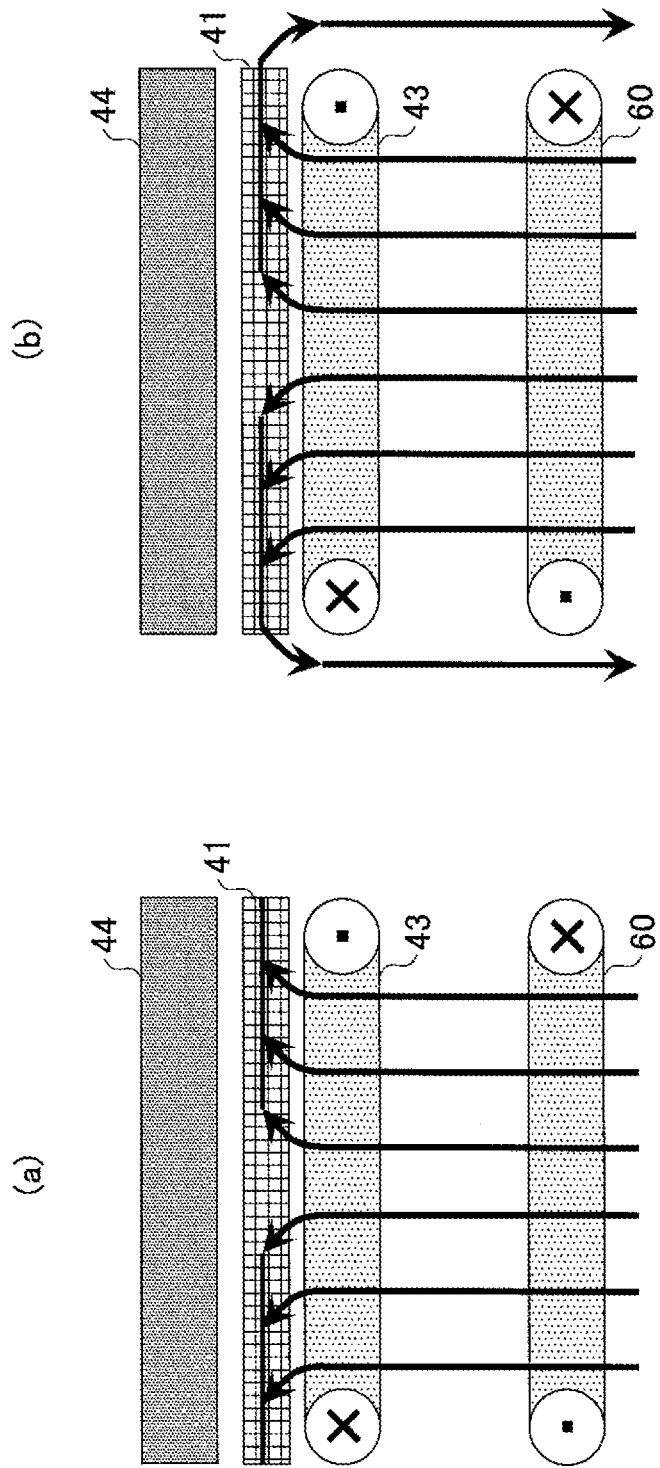
FIG. 15 is a drawing illustrating a shielding effect observed when only the first magnetic shield is disposed for comparison purposes.

FIG. 15 is a drawing illustrating a shielding effect observed when only the first magnetic shield 41 is disposed for comparison purposes. It may be noted that the first magnetic shield 41 has the permeability characteristics and the magnetic loss characteristics as described in connection with FIG. 11.

FIG. 15(a) illustratively depicts the flow of magnetic flux of an alternating current magnetic field of the communication-purpose frequency f2 illustrated in FIG. 11. As was previously described, the first magnetic shield 41 is not suitable as a communication-purpose shield because of the loss with respect to the magnetic field of the communication-purpose frequency f2. The magnetic flux indicated by arrows in FIG. 15(a) is thus mostly lost due to loss in the first magnetic shield 41, and only partly returns to the transmission-side coil 60. As a result, a significant portion of the signal power transmitted from the transmission-side coil 60 is lost, resulting in the communication having extremely weak signal strength. There may be a possibility of failing to achieve proper communication. It may be noted that FIG. 15(a) illustrates the situation as if the magnetic flux was completely lost due to the loss in the first magnetic shield 41 in order to emphasize the effect of loss.

FIG. 15(b) illustratively depicts the flow of magnetic flux of an alternating current magnetic field of the power-transmission-purpose frequency f1 illustrated in FIG. 11. As was previously described, the first magnetic shield 41 is suitable as a power-transmission-purpose shield in the sense of having a function to guide the magnetic field of the power-transmission-purpose frequency f1 without incurring loss. The power-transmission-purpose magnetic flux indicated by arrows in FIG. 15(b) thus flows along the first magnetic shield 41 without suffering loss, and forms a circulating flow to return to the coil 60 without loss.

In this manner, with the provision of only the first magnetic shield 41, a proper shielding effect is of course provided with respect to the alternating current magnetic field of the power-transmission-purpose frequency f1, but a proper shielding effect is not provided with respect to the alternating current magnetic field of the communication-purpose frequency f2. Accordingly, it is preferable to situate the first magnetic shield 41 towards the center of the inside of the case and to situate the second magnetic shield 42 towards the coil 43 as illustrated in FIG. 12.

Figure 16:
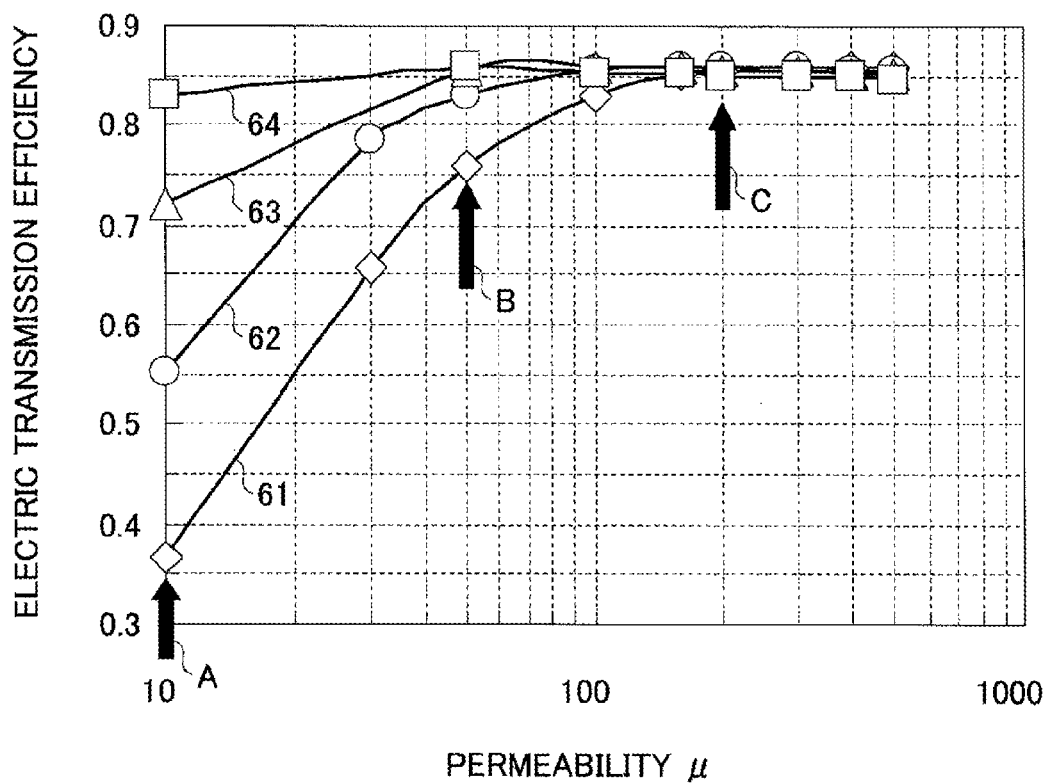
FIG. 16 is a drawing illustrating the results of simulation that obtains magnetic loss observed when only one of the first magnetic shield and the second magnetic shield is arranged.

FIG. 16 is a drawing illustrating the results of simulation that obtains magnetic loss observed when only one of the first magnetic shield 41 and the second magnetic shield 42 is arranged. For the sake of simplicity, magnetic loss was assumed such that tan Δ of complex permeability is equal to 0.01. Electric transmission efficiency was calculated while changing permeability and the thickness of the magnetic shield. The horizontal axis represents permeability, and the vertical axis represents electric transmission efficiency. Electric transmission efficiency characteristics 61, 62, 63, and 64 correspond to magnetic shield thicknesses of 0.05 mm, 0.1 mm, 0.2 mm, and 0.5 mm, respectively. Drop in the electric transmission efficiency is tantamount to communication failure and loss in the case of communication. Further, it is preferable to use a magnetic shield that is as thin as possible for the purpose of space conservation when a non-contact module (i.e., coil and magnetic shield) is embedded inside a portable apparatus on which strong size restriction is imposed. As indicated by the electric transmission efficiency characteristics 61, there is a significant drop in electric transmission efficiency in a low permeability range in the case of the 0.05-mm-thickness magnetic shield.

When only the second magnetic shield 42 is arranged as illustrated in FIG. 14, permeability is 50 at both the power-transmission-purpose frequency f1 and the communication-purpose frequency f2. The electric transmission efficiency in this case is thus at the position indicated by an arrow B. In the case of the thickness of the magnetic shield being 0.05 mm, electric transmission efficiency is 75%, which is 15% lower than a maximum value of 90%. Such a level of efficiency reduction at the time of communication is not so problematic because signal amplification can compensate. However, an efficiency reduction of 15% at the time of power transmission may be regarded as extremely inefficient.

When only the first magnetic shield 41 is arranged as illustrated in FIG. 15, permeability is 200 at the power-transmission-purpose frequency f1. The electric transmission efficiency in this case is thus at the position indicated by an arrow C. Since permeability is 10 at the communication-purpose frequency f2, the electric transmission efficiency is at the position indicated by an arrow A. In the case of the thickness of the magnetic shield being 0.05 mm, electric transmission efficiency at the time of power transmission is 90%, which is not problematic. However, electric transmission efficiency at the time of communication is 36%, which is a significant efficiency reduction. Consequently, it becomes difficult to maintain proper communication.

On the other hand, when the first magnetic shield 41 is situated towards the center of the inside of the case, and the second magnetic shield 42 is situated towards the coil 43 as illustrated in FIG. 12, permeability is 200+α at the power-transmission-purpose frequency f1, and is 50% at the communication-purpose frequency f2. Namely, an electric transmission efficiency of 90% is achieved at the time of power transmission, and, also, the electric transmission efficiency indicated by the arrow B in FIG. 16 is achieved at the time of communication. Accordingly, efficient power transmission and satisfactory communication are both achieved at the same time.

According to at least one embodiment of the present disclosures, a portable apparatus and a feed system are provided in which an appropriate magnetic shield can be provided when a shared coil position is used for both low-frequency non-contact power feeding and high-frequency communication.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A portable apparatus, comprising:
a case;
a coil situated inside the case;
a circuit disposed inside the case to receive power based on a first frequency via the coil and to perform communication based on a second frequency higher than the first frequency; and
a magnetic shield having a first portion and a second portion stacked one over another in a direction perpendicular to the coil between the coil and an inside of the case, the second portion being closer to the coil than the first portion,
wherein permeability of the first portion is higher than permeability of the second portion situated toward the coil with respect to the first frequency, and the permeability of the first portion is lower than the permeability of the second portion situated toward the coil with respect to the second frequency, the second frequency being higher than the first frequency.

2. The portable apparatus as claimed in claim 1, wherein the coil is a single coil, or includes two coils that are disposed to overlap each other at least partially.

3. The portable apparatus as claimed in claim 1, wherein the magnetic shield includes:
a first shield situated towards the inside of the case and serving as the first portion; and
a second shield situated towards the coil and serving as the second portion, wherein permeability of the first shield is higher than permeability of the second shield at the first frequency.

4. A feed system, comprising:
a power transmission apparatus; and
a portable apparatus to which power is transmitted via magnetism from the power transmission apparatus,
wherein the portable apparatus includes:
a case;
a coil situated inside the case;
a circuit disposed inside the case to receive power based on a first frequency from the power transmission apparatus via the coil and to perform communication based on a second frequency higher than the first frequency; and
a magnetic shield having a first portion and a second portion stacked one over another in a direction perpendicular to the coil between the coil and an inside of the case, the second portion being closer to the coil than the first portion,
wherein permeability of the first portion is higher than permeability of the second portion with respect to the first frequency, and the permeability of the first portion is lower than the permeability of the second portion with respect to the second frequency, the second frequency being higher than the first frequency.

5. The feed system as claimed in claim 4, wherein the coil is a single coil, or includes two coils that are disposed to overlap each other at least partially.

6. The feed system as claimed in claim 4, wherein the magnetic shield includes:
a first shield situated towards the inside of the case and serving as the first portion; and
a second shield situated towards the coil and serving as the second portion, wherein permeability of the first shield is higher than permeability of the second shield at the first frequency.

* * * * *